(12) United States Patent
Brewer et al.

(10) Patent No.: US 9,710,756 B2
(45) Date of Patent: Jul. 18, 2017

(54) SYSTEMS AND METHODS FOR PAGE RECOMMENDATIONS BASED ON PAGE RECIPROCITY

(71) Applicant: Facebook, Inc., Menlo Park, CA (US)

(72) Inventors: Jason Brewer, Kirkland, WA (US);
Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 200 days.

(21) Appl. No.: 14/570,825

(22) Filed: Dec. 15, 2014

(65) Prior Publication Data

US 2016/0171381 A1    Jun. 16, 2016

(51) Int. Cl.
| G06N 3/08 | (2006.01) |
| G06F 17/30 | (2006.01) |
| G06N 7/00 | (2006.01) |
| G06N 99/00 | (2010.01) |
| H04N 21/25 | (2011.01) |

(52) U.S. Cl.
CPC .............. G06N 7/005 (2013.01); G06N 3/08 (2013.01); G06N 99/005 (2013.01); H04N 21/251 (2013.01); *G06F 17/30* (2013.01)

(58) Field of Classification Search
USPC .......................................................... 706/11
See application file for complete search history.

(56) References Cited

U.S. PATENT DOCUMENTS

| 9,210,228 | B2 * | 12/2015 | Williams | .............. | H04L 67/306 |
| 9,538,340 | B2 * | 1/2017 | Ju | .............. | H04W 4/08 |
| 9,560,154 | B2 * | 1/2017 | Song | .............. | H04L 67/26 |
| 9,563,709 | B2 * | 2/2017 | Green | .............. | G06F 17/30867 |
| 2010/0030717 | A1 * | 2/2010 | Agarwal | .............. | G06Q 30/02 706/46 |
| 2014/0359786 | A1 * | 12/2014 | Lee | .............. | G06F 21/10 726/27 |
| 2016/0042279 | A1 * | 2/2016 | Wong | .............. | H04L 67/306 706/46 |

(Continued)

OTHER PUBLICATIONS

Finding Experts Using Social Network Analysis Yupeng Fu; Rongjing Xiang; Yiqun Liu; Min Zhang; Shaoping Ma Web Intelligence, IEEE/WIC/ACM International Conference on Year: 2007 pp. 77-80, DOI: 10.1109/WI.2007.14 IEEE Conference Publications.*

(Continued)

*Primary Examiner* — Michael B Holmes
(74) *Attorney, Agent, or Firm* — Sheppard Mullin Richter & Hampton LLP

(57) ABSTRACT

Systems, methods, and non-transitory computer readable media configured to determine whether a candidate content item may be presented in response to an indication of approval by a user regarding a seed content item according to a first technique. It is determined whether the seed content item may be presented in response to an indication of approval by the user regarding the candidate content item according to a second technique. Features, including a reciprocity feature based on the determining whether a candidate item may be presented and the determining whether the seed content item may be presented, are processed to generate a probability that the user will interact with the candidate content item.

19 Claims, 7 Drawing Sheets

(56) References Cited

U.S. PATENT DOCUMENTS

| | | | | |
|---|---|---|---|---|
| 2016/0044120 A1* | 2/2016 | Williams | ............. | H04L 67/306 709/204 |
| 2016/0044121 A1* | 2/2016 | Williams | ............. | H04L 67/306 709/204 |
| 2016/0134576 A1* | 5/2016 | Ju | ............. | G06Q 50/01 709/204 |
| 2016/0134692 A1* | 5/2016 | Ju | ............. | H04W 4/08 709/204 |
| 2016/0162503 A1* | 6/2016 | Yao | ............. | G06F 17/30867 707/723 |
| 2016/0171382 A1* | 6/2016 | Brewer | ............. | G06F 17/30867 706/11 |

OTHER PUBLICATIONS

GuidedTracker: Track the victims with access logs to finding malicious web pages Hongzhou Sha; Qingyun Liu; Zhou Zhou; Chao Zheng 2014 IEEE Global Communications Conference Year: 2014 pp. 564-569, DOI: 10.1109/GLOCOM.2014.7036867 IEEE Conference Publications.*

Profit Maximization over Social Networks Wei Lu; Laks V. S. Lakshmanan 2012 IEEE 12th International Conference on Data Mining Year: 2012 pp. 479-488, DOI: 10.1109/ICDM.2012.145 IEEE Conference Publications.*

Fast Search to Detect Communities by Truncated Inverse Page Rank in Social Networks Fei Jiang; Yang Yang; Shuyuan Jin; Jin Xu 2015 IEEE International Conference on Mobile Services Year: 2015 pp. 239-246, DOI: 10.1109/MobServ.2015.42 IEEE Conference Publications.*

* cited by examiner

SYSTEMS AND METHODS FOR PAGE RECOMMENDATIONS BASED ON PAGE RECIPROCITY

FIELD OF THE INVENTION

The present technology relates to the field of content provision. More particularly, the present technology relates to techniques for recommending pages.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that likewise would be of high interest to the user. Provision of additional content items that are of high interest to the user enhances user experience and can help realize the full potential of the social network. Unfortunately, attempts to provide such additional content items and to maintain a high level of interest from the user often fail.

SUMMARY

Various embodiments of the present disclosure can include systems, methods, and non-transitory computer readable media configured to determine whether a candidate content item may be presented in response to an indication of approval by a user regarding a seed content item according to a first technique. It is determined whether the seed content item may be presented in response to an indication of approval by the user regarding the candidate content item according to a second technique. Features, including a reciprocity feature based on the determining whether a candidate item may be presented and the determining whether the seed content item may be presented, are processed to generate a probability that the user will interact with the candidate content item.

In an embodiment, the seed content item is a seed page and the candidate content item is a candidate page.

In an embodiment, an existence of reciprocity associated with the reciprocity feature is determined based on the first technique providing a forward recommendation and the second technique providing a reverse recommendation.

In an embodiment, a value of the reciprocity feature is determined.

In an embodiment, the value of the reciprocity feature is binary.

In an embodiment, the value of the reciprocity feature is a score based on a strength of reciprocity between the seed content item and the candidate content item.

In an embodiment, the first technique and the second technique are same.

In another embodiment, the first technique and the second technique are different.

In an embodiment, the processing features further comprises applying a machine learning technique based on the features.

In an embodiment, the candidate content item is selected for presentation to the user based on the probability that the user will interact with the candidate content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
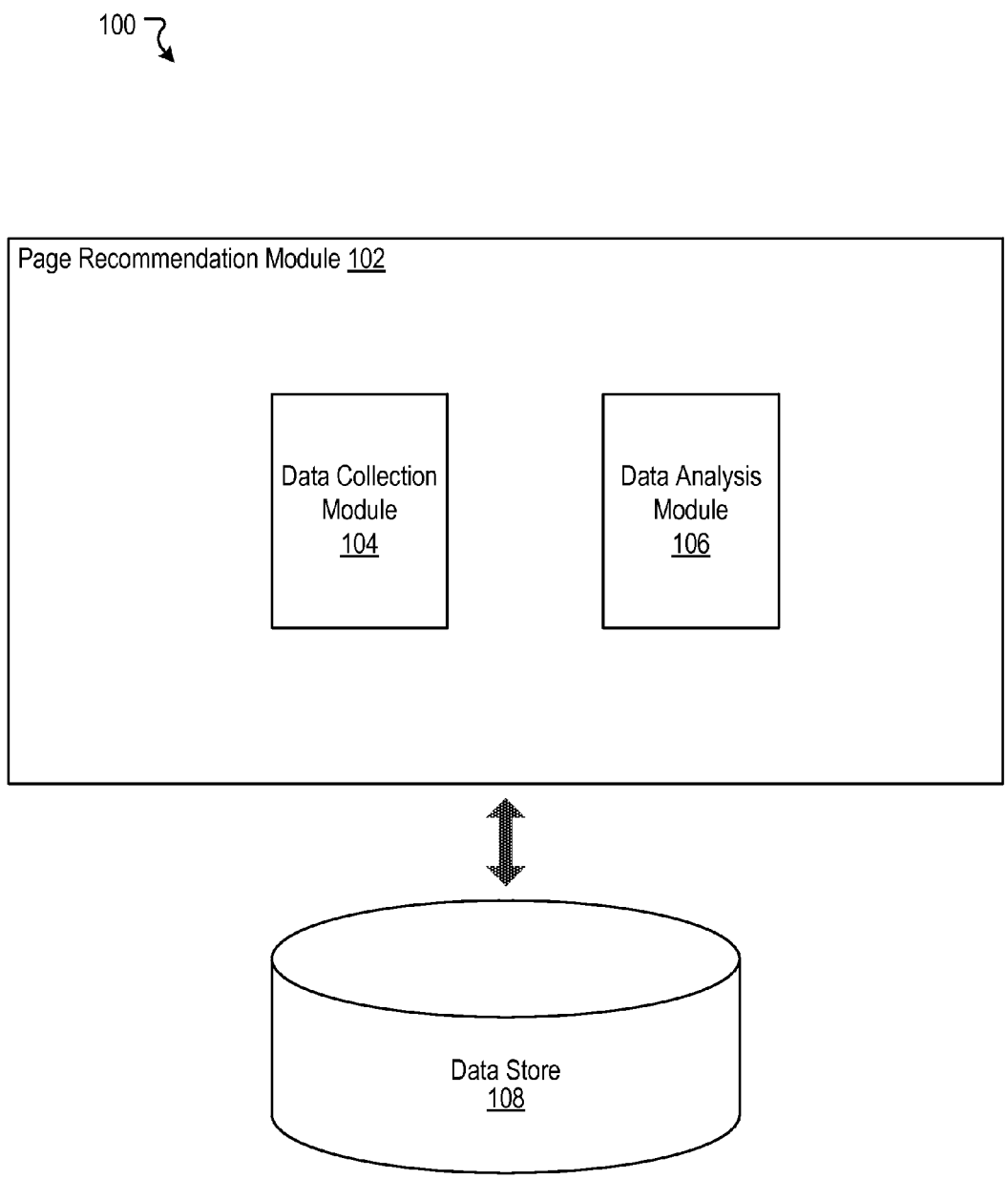
FIG. 1 illustrates an example page recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Page Recommendations to Users

People use computing devices (or systems) for a wide variety of purposes. Computing devices can provide different kinds of functionality. Users can utilize their computing devices to produce information, access information, and share information. In some cases, users can use their computing devices to generate and publish content postings. Content items can include any combination of content types, such as text, images, videos, and audio. The content items can be shared for consumption by others through a social networking system. The content items can be shared in a variety of formats, such as posts to the social networking system.

The conventional presentation of content items can entail many disadvantages. When a user indicates approval of or interest in a first content item, the social networking system may attempt to identify additional content items that are of interest to the user. However, when presented to the user, the additional content items may not be desirable to the user because they are not well matched with the interests of the user. In such circumstances, the user can be provided with content items that the user deems unfamiliar, irrelevant, or worse. As a result, the user experience of the social networking system can suffer.

An improved approach to the presentation of additional content items overcomes the foregoing and other disadvantages associated with conventional approaches. The present disclosure can allow for the determination of one or more candidate pages as additional content items after a user has expressed interest in or otherwise indicated approval of (e.g., liked) an original content item, such as a seed page. The original content item can be, for example, any content item presented by the social networking system. The present disclosure can determine various features relating to user behavior associated with the seed page and candidate pages. A particular feature can relate to reciprocity between a first page and a second page. Reciprocity between the first page and the second page occurs when both the second page is proposed as a candidate page after a user indicates approval of the first page as a seed page and the first page is proposed as a candidate page after a user indicates approval of the second page as a seed page. As discussed herein, reciprocity can relate to reciprocity between recommender systems (or between recommendations). The existence of reciprocity between the first page and the second page can be represented by a reciprocity feature having a value that provides a positive signal indicating that the second page is a relatively good candidate page for the first page as a seed page. The absence of reciprocity between the first page and the second page can be represented by a reciprocity feature having a value that provides a negative signal indicating that the second page is a relatively bad candidate page for the first page as a seed page. The reciprocity feature and other features relating to, for example, user behavior associated with the seed page and the candidate page can be analyzed by a machine learning technique to determine the probability that a candidate page will be of interest to the user. The probabilities associated with candidate pages can inform which candidate page or candidate pages to present to the user after the presentation of the seed page.

FIG. 1 illustrates an example system 100 including an example page recommendation module 102 configured to determine additional content items to present to a user of a social networking system, according to an embodiment of the present disclosure. The additional (candidate) content items can be presented to the user after the user has expressed interest in or otherwise indicated approval of (e.g., liked) an original (seed) content item. The seed content item can include, for example, a content item in a newsfeed (e.g., story) supported by the social networking system that is presented to the user, a timeline of a page associated with a member of the social networking system, or any other type of content item. The candidate content items can include, for example, pages associated with members of the social networking system that exhibit sufficient relatedness with regard to the seed content item so as to maintain the interest of the user and to cause the user to interact with or perform a conversion with respect to the pages.

The page recommendation module 102 can include a data collection module 104 and a data analysis module 106. In some instances, the example system 100 can also include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the page recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page recommendation module 102 can be implemented, in part or in whole, as software running on one or more computing devices or systems, such as on a user or client computing device. For example, the page recommendation module 102 can be implemented as or within an application (e.g., app), a program, or an applet, etc., running on a user computing device or client computing system. In some instances, the page recommendation module 102 can, in part or in whole, be implemented within or configured to operate in conjunction with a social networking system (or service), such as the social networking system 630 of FIG. 6. It should be understood that many variations are possible.

The data collection module 104 can be configured to facilitate collection of data relating to online user behavior and other characteristics regarding pages of the social networking system. The pages for which data relating to online user behavior and other characteristics are collected include a seed page (or other seed content items) in which the user has indicated approval and candidate pages (or other candidate content items) that are considered for presentation to the user after the user has indicated approval of a seed page. The data relating to online user behavior and other characteristics regarding pages may include, for example, the number of conversions for each of the seed page, the candidate page, and the seed page/candidate page pair and the number of impressions for each of the seed page, the candidate page, and the seed page/candidate page pair. A conversion can be any action taken by the user in relation to the candidate page, including but not limited to liking the page, subscribing to the page, sharing the page, saving the page, posting to the page, purchasing from the page, communicating with the page, etc. The data relating to online user behavior and other characteristics regarding pages also may include, for example, the data required by the techniques used to identify candidate content items for a seed content item, as discussed in more detail herein.

In some embodiments, the data analysis module 106 can be configured to determine one or more candidate pages for presentation to the user after the user has indicated approval of a seed page. Various features based on a seed page and candidate pages can be determined. One feature among the various features is a reciprocity feature that reflects whether a first page and a second page exhibit reciprocity. Reciprocity between the first page and the second page exists when both the second page is determined to be a candidate page after a user has indicated approval of the first page and the first page is determined to be a candidate page after a user has indicated approval of the second page. A technique based in part on machine learning can be applied to the features, including the reciprocity feature, to determine the probability that the user will approve of or otherwise interact with (e.g., perform a conversion on) the candidate page. All of the candidate pages can be assessed based on their probabilities that the user will interact with them. One or more candidate pages can be identified for presentation to the user based on their probabilities that the user will approve of them.

The data store 108 can be configured to store and maintain various types of data, such as the data relating to online user behavior and other characteristics regarding pages. The data store 108 can store the conversion data and the impression data for seed pages, candidate pages, and seed page/candidate page pairs. The conversion data and the impression data for seed pages, candidate pages, and seed page/candidate page pairs can reflect any suitable historical time period, including for example, one week, 30 days, 60 days, six months, a year, five years, etc.

The data collection module 104 can retrieve the conversion data and the impression data and provide the conversion data and the impression data to the data analysis module 106. The data store 108 can also maintain other information associated with the social networking system. The information associated with the social networking system can include data about users, social connections, social interactions, locations, geo-fenced areas, maps, places, events, groups, posts, communications, content, account settings, privacy settings, a social graph, and various other types of data. In some implementations, the data store 108 can store information associated with users, such as user identifiers, user information, user specified settings, content produced by users, and various other types of user data. As shown in the example system 100, the page recommendation module 102 can be configured to communicate and/or operate with the data store 108.

Figure 2:
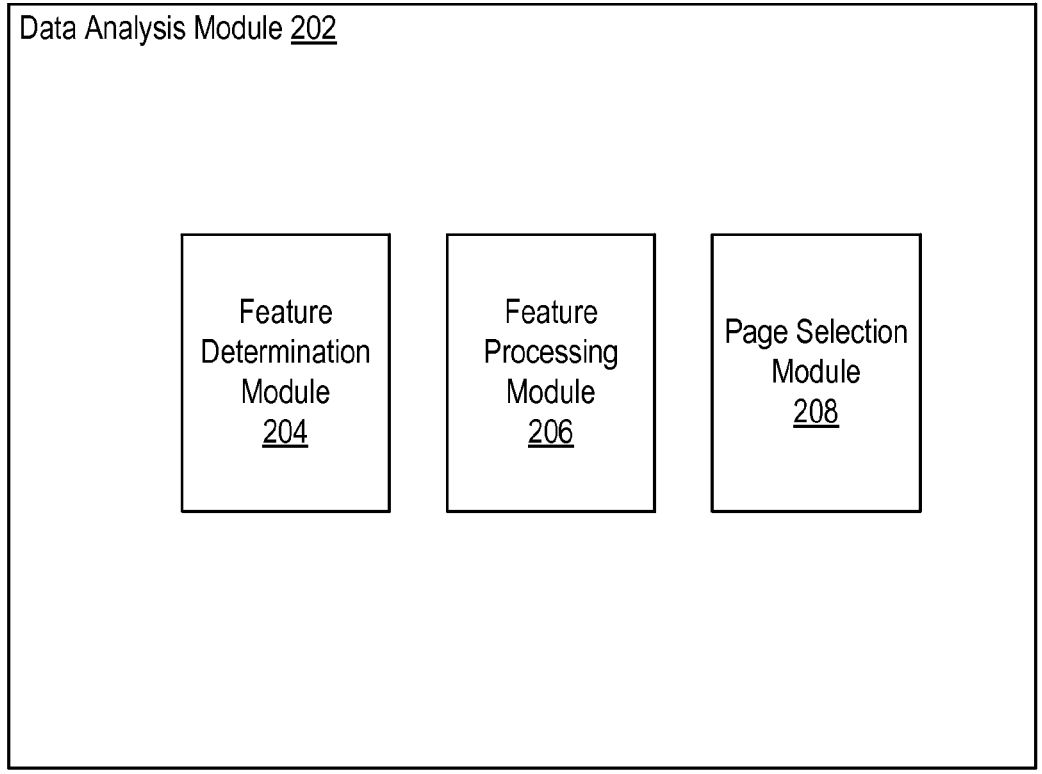
FIG. 2 illustrates an example data analysis module, according to an embodiment of the present disclosure.

FIG. 2 illustrates an example data analysis module 202 configured to determine one or more candidate pages for presentation to a user, according to an embodiment of the present disclosure. In some embodiments, the data analysis module 106 of FIG. 1 can be implemented as the data analysis module 202. As shown in the example of FIG. 2, the data analysis module 202 can include a feature determination module 204, a feature processing module 206, and a page selection module 208.

The feature determination module 204 can determine features to generate the probability of a user converting on a candidate page after an indication of approval by the user regarding a seed page. Features can include various parameters regarding data relating to online user behavior and other characteristics regarding a seed page, a candidate page, and a seed page/candidate page pair. The features can include, for example, a reciprocity feature that reflects whether a first page and a second page exhibit reciprocity. In some embodiments, reciprocity between the first page and the second page can be deemed to exist when both the second page is determined to be a candidate page after a user has indicated approval of the first page and the first page is determined to be a candidate page after a user has indicated approval of the second page. The existence of reciprocity between a seed page and a candidate page in many instances can be a positive signal regarding the selection of the candidate page for the seed page.

In addition to the reciprocity feature, the features also can include, for example, the number of conversions for each of the seed page, the candidate page, and the seed page/candidate page pair and the number of impressions for each of the seed page, the candidate page, and the seed page/candidate page pair. The features also can include, for example, the ratio of the number of conversions over the number of impressions (i.e., conversion rate) for the seed page, the conversion rate for the candidate page, and the conversion rate for the seed page/candidate page pair. The features also can include, for example, the ratio of conversion rate for the seed page/candidate page pair over the conversation rate for the seed page and the ratio of the conversion rate for the seed page/candidate page pair over the conversion rate for the candidate page. In some embodiments, alternative and additional features may be used.

The feature processing module 206 can process the features to determine a probability that the user will convert on a candidate page. The feature processing module 206 can apply a machine learning technique based on the features. In some embodiments, the machine learning technique may include use of a boosted decision tree algorithm. The features can be applied to one or more boosted decision trees. The boosted decision trees can appropriately weight the features to reflect their importance in determining whether a conversion will be performed on a candidate page. In some embodiments, the number of boosted decision trees can be, for example, 50, 100, 700, 1,500, or any suitable number. Each boosted decision tree can produce an output. The outputs can be combined using a linear regression technique. The linear regression technique can produce a probability that the user will select the candidate page after an indication of approval of the seed page.

The page selection module 208 can determine one or more candidate pages to present to the user. The page selection module 208 can receive the probabilities that the user will select each of the candidate pages from the feature processing module 206. The page selection module 208 can select from the candidate pages one or more candidate pages to present to the user. In some embodiments, the selection of the one or more candidate pages for presentation to the user can be based on a ranking of the candidate pages according to their probabilities that the user will select the candidate pages. The candidate pages or an indication of the candidate pages with the highest probabilities can be qualified for presentation to the user. In some embodiments, the selection of the one or more candidate pages can be based on the satisfaction of a threshold value of probability. When the threshold value of probability is satisfied with respect to a particular candidate page, the candidate page or an indication of the candidate page can be qualified for presented to the user. In some embodiments, the page selection module 208 can be configured to present to the user no fewer than a threshold number of qualified candidate pages. If the number of qualified candidate pages satisfies the threshold number, the qualified candidate pages can be presented to the user. If the number of qualified candidate pages does not satisfy the threshold number, none of the qualified candidate pages can be presented to the user.

Figure 3:
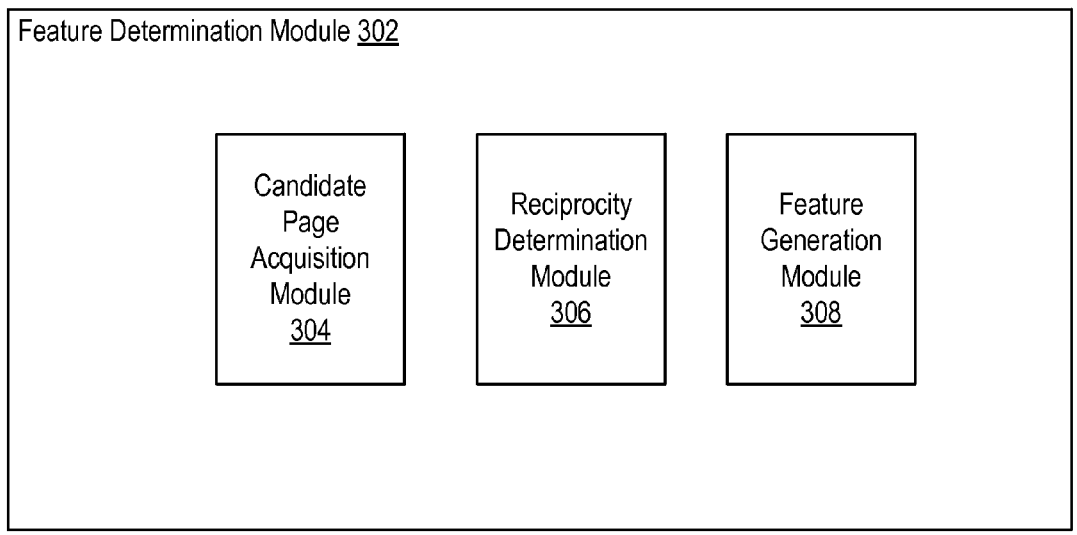
FIG. 3 illustrates an example feature determination module, according to an embodiment of the present disclosure.

FIG. 3 illustrates an example feature determination module 302, according to an embodiment of the present disclosure. The feature determination module 302 can be configured to facilitate the determination of features to inform the determination of candidate pages for presentation to the user. In some embodiments, the feature determination module 204 can be implemented by the feature determination module 302. The feature determination module 302 can include a candidate page acquisition module 304, a reciprocity determination module 306, and a feature generation module 308.

The candidate page acquisition module 304 is configured to determine candidate pages based on a seed page. The determination of candidate pages can be performed according to any one or more suitable techniques. Such techniques can include, for example, topic authorities, co-visitation, and matrix factorization. Other techniques to determine candidate pages for a seed page are possible.

The reciprocity determination module 306 is configured to determine whether there is reciprocity between a seed page and a candidate page. In general, reciprocity between a first page (seed page) and a second page (candidate page) exists when both the second page is determined to be a candidate page after a user has indicated approval of the first page and the first page is determined to be a candidate page after a user has indicated approval of the second page. A forward recommendation (edge) can be deemed to be provided when the second page is determined to be a candidate page after a user has indicated approval of the first page. A reverse recommendation (edge) can be deemed to be provided when the first page is determined to be a candidate page after a user has indicated approval of the second page. In some instances, reciprocity can be determined offline as well. For example, if a candidate source is based on a technique, such as matrix factorization (single value decomposition), it can be determined whether a second page appears among the top recommendations for a first page and whether the first page appears among the top recommendations for the second page.

The existence of reciprocity between a seed page and a candidate page can be a positive signal regarding the selection of the candidate page for the seed page. Reciprocity between the first page and the second page is absent when the second page is determined to be a candidate page after a user has indicated approval of the first page but the first page is not determined to be a candidate page after a user has indicated approval of the second page. The absence of reciprocity between a seed page and a candidate page can be a negative signal regarding the selection of the candidate page for the seed page.

A determination of the existence or absence of reciprocity can be based on one or more of the techniques to determine candidate pages for a seed page. For example, reciprocity can be deemed to exist for a seed page and a candidate page when one technique provides a forward recommendation and the same technique provides a reverse recommendation. As another example, reciprocity can be deemed to exist for a seed page and a candidate page when a first technique in a set of techniques provides a forward recommendation and a second technique, whether the same as or different from the first technique, in the set of techniques provides a reverse recommendation.

The number of techniques that can be used to provide a forward recommendation and a reverse recommendation to establish the existence of reciprocity can reflect a desired level of symmetry. A higher level of symmetry may tend to require that one technique provide for a forward recommendation and the same technique provide a reverse recommendation. A lower level of symmetry may tend to require that one technique out of a selected number of techniques provides a forward recommendation and the same technique or another technique among the selected number of techniques provides a reverse recommendation. In some instances, a higher level of symmetry may be used, for example, when relatively many candidate pages exist for a seed page or when the use of higher symmetry would provide better candidate pages. In some instances, a lower level of symmetry may be used when, for example, relatively few candidate pages exist for a seed page or when the use of lower symmetry would provide better candidate pages.

The feature generation module 308 can generate features based on the data relating to online user behavior and other characteristics regarding pages. The existence of reciprocity between a first page and a second page can be represented by a reciprocity feature having a value that provides a positive signal indicating that the second page is a relatively good candidate page for the first page as a seed page. The absence of reciprocity between the first page and the second page can be represented by a reciprocity feature having a value that provides a negative signal indicating that the second page is a relatively bad candidate page for the first page as a seed page.

The existence or absence of reciprocity can be reflected in the value of the reciprocity feature. For example, the existence of reciprocity between the first page and the second page can be represented by a reciprocity feature having a value of 1 or any other suitable value while the absence of reciprocity between the first page and the second page can be represented by a reciprocity feature having a value of 0 or any other suitable value. In some embodiments, the existence (or absence) of reciprocity can be represented by a non-binary score that indicates the strength (or weakness) of the reverse recommendation. For example, a relatively strong reverse recommendation may be reflected in a relatively higher reciprocity feature score and a relatively weak reverse recommendation may be reflected in a relatively lower reciprocity feature score.

In certain instances, the existence or absence of reciprocity need not be a negative signal. When the size (or popularity) of a seed page and the size (or popularity) of a candidate page differs significantly (e.g., by a threshold value), the absence of reciprocity may not be a negative signal regarding the probability that a user will convert on the candidate page. The size of a page may be indicated by the number of likes of the page, the number of shares of the page, the number of fans of the page, etc. For example, a candidate page that is larger than a seed page by a threshold value may have a significant or high probability of conversion even if there is no reciprocity between the seed page and the candidate page. Accordingly, the value of the reciprocity feature in such instances may be appropriately adjusted.

Other features can include various parameters regarding data relating to online user behavior and other characteristics regarding a seed page, a candidate page, and a seed page/candidate page pair.

Figure 4:
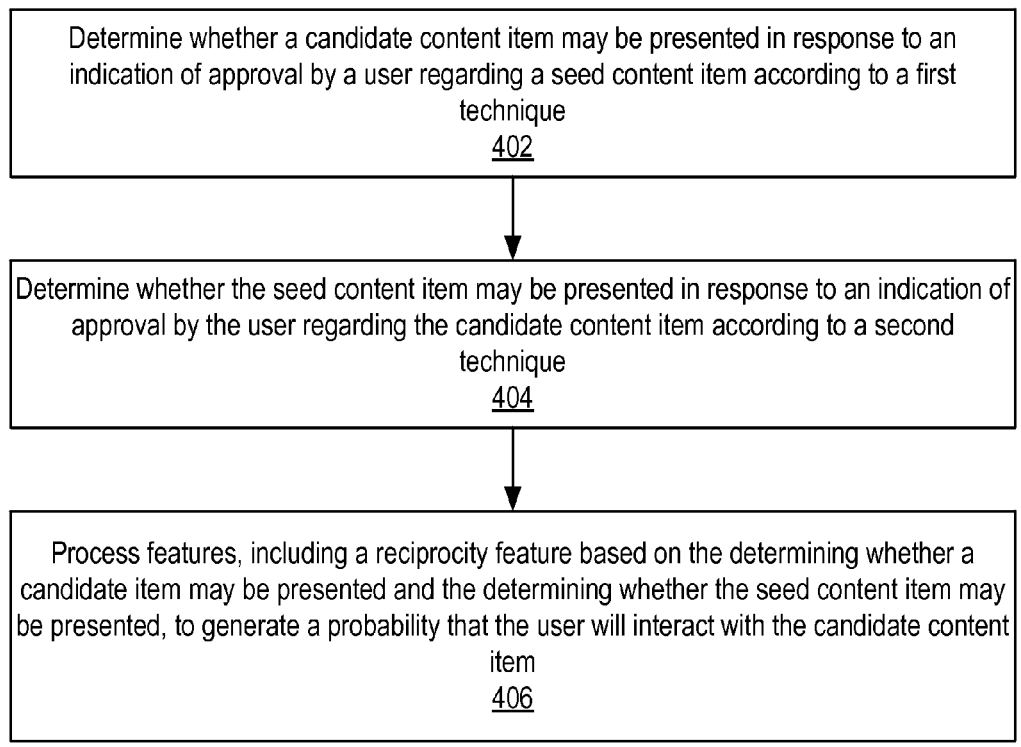
FIG. 4 illustrates a first example method for selection of a candidate content item, according to an embodiment of the present disclosure.

FIG. 4 illustrates an example method 400 for selection of a candidate content item, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can determine whether a candidate content item may be presented in response to an indication of approval by a user regarding a seed content item according to a first technique. At block 404, the method 400 can determine whether the seed content item may be presented in response to an indication of approval by the user regarding the candidate content item according to a second technique. At block 406, the method 400 can process features, including a reciprocity feature based on the determining whether a candidate item may be presented and the determining whether the seed content item may be presented, to generate a probability that the user will interact with the candidate content item. Other suitable techniques are possible.

Figure 5:
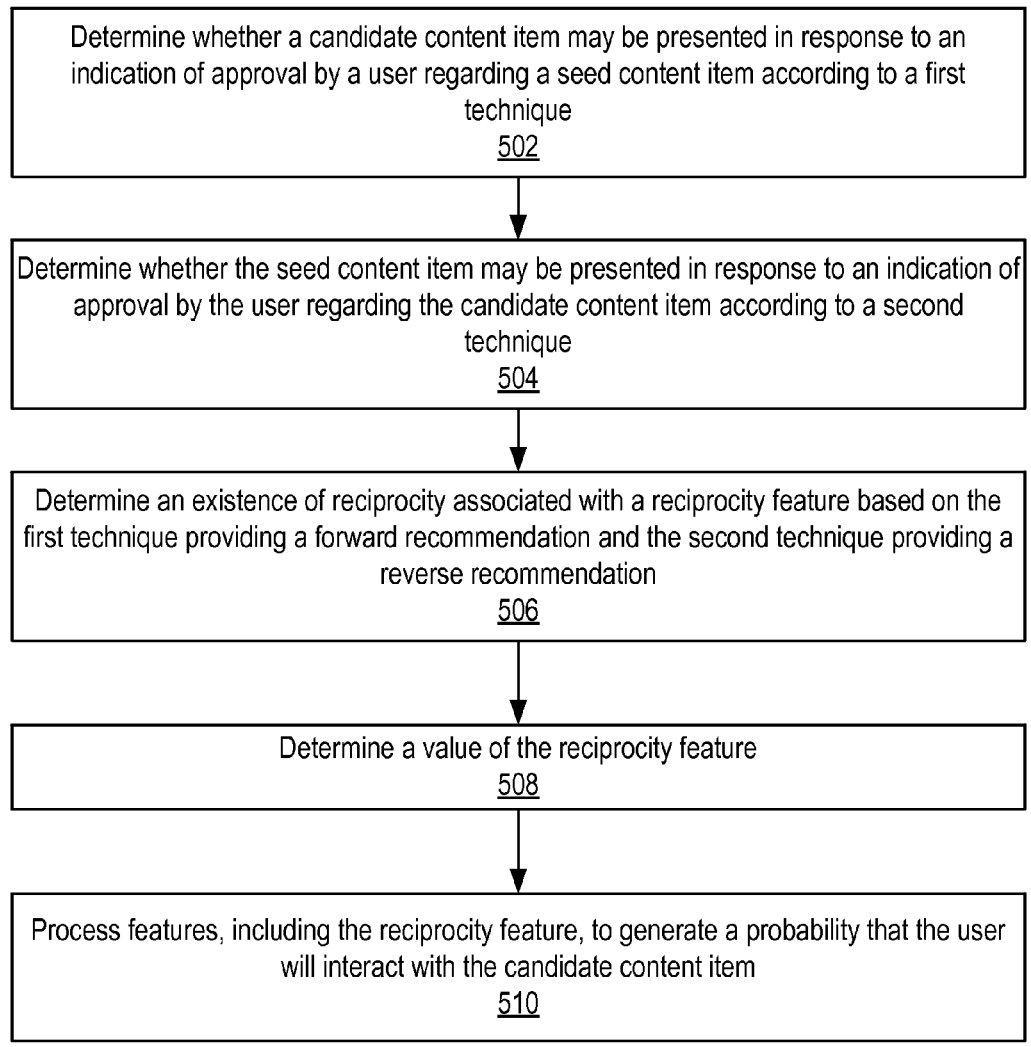
FIG. 5 illustrates a second example method for selection of a candidate content item, according to an embodiment of the present disclosure.

FIG. 5 illustrates an example method 500 for selection of a candidate content item, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can determine whether a candidate content item may be presented in response to an indication of approval by a user regarding a seed content item according to a first technique. At block 504, the method 500 can determine whether the seed content item may be presented in response to an indication of approval by the user regarding the candidate content item according to a second technique. At block 506, the method 500 can determine an existence of reciprocity associated with a reciprocity feature based on the first technique providing a forward recommendation and the second technique providing a reverse recommendation. At block 508, the method 500 can determine a value of the reciprocity feature. At block 510, the method 500 can process features, including the reciprocity feature, to generate a probability that the user will interact with the candidate content item. Other suitable techniques are possible.

Social Networking System—Example Implementation

Figure 6:
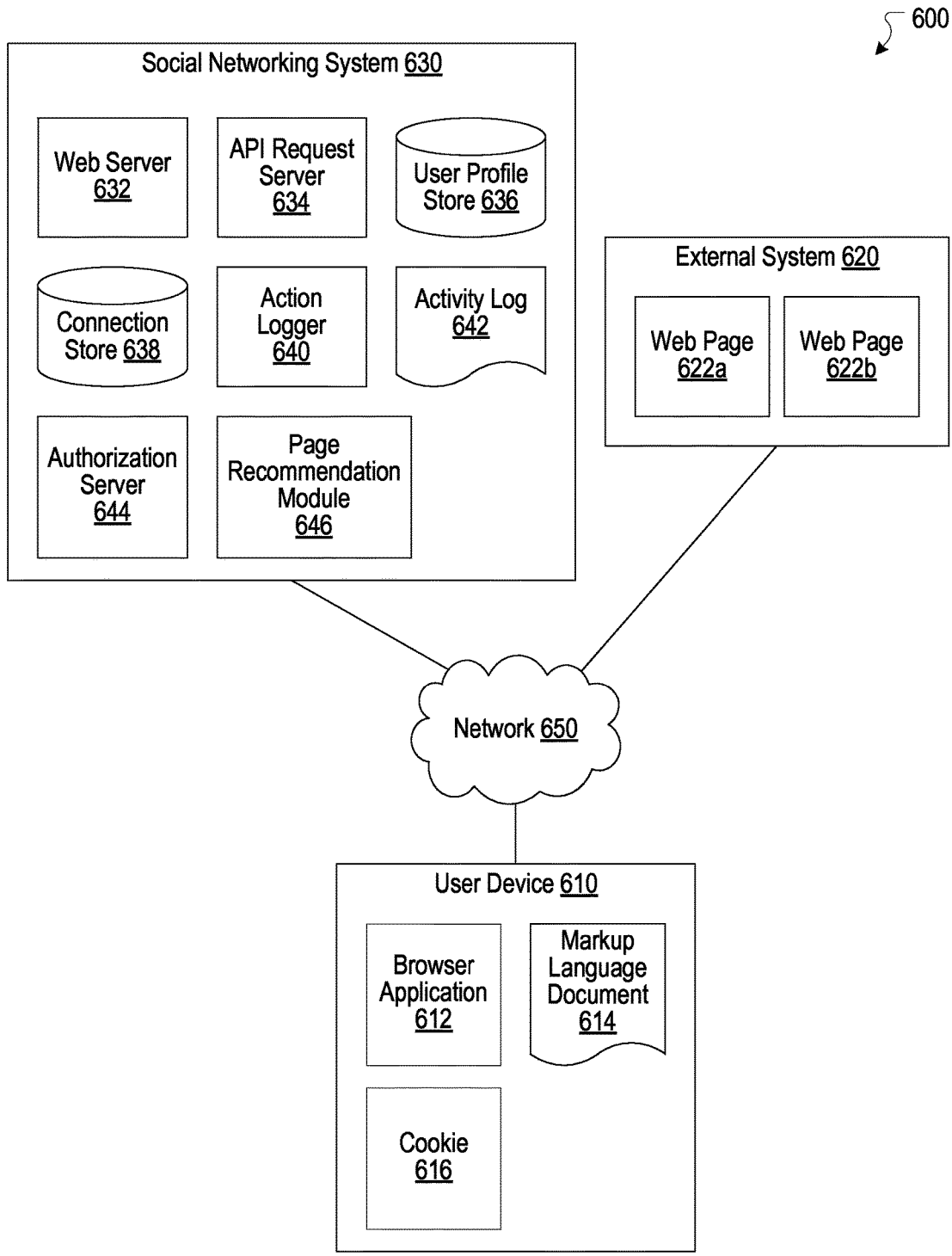
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page recommendation module 646. The page recommendation module 646 can be implemented with the page recommendation module 102.

Hardware Implementation

Figure 7:
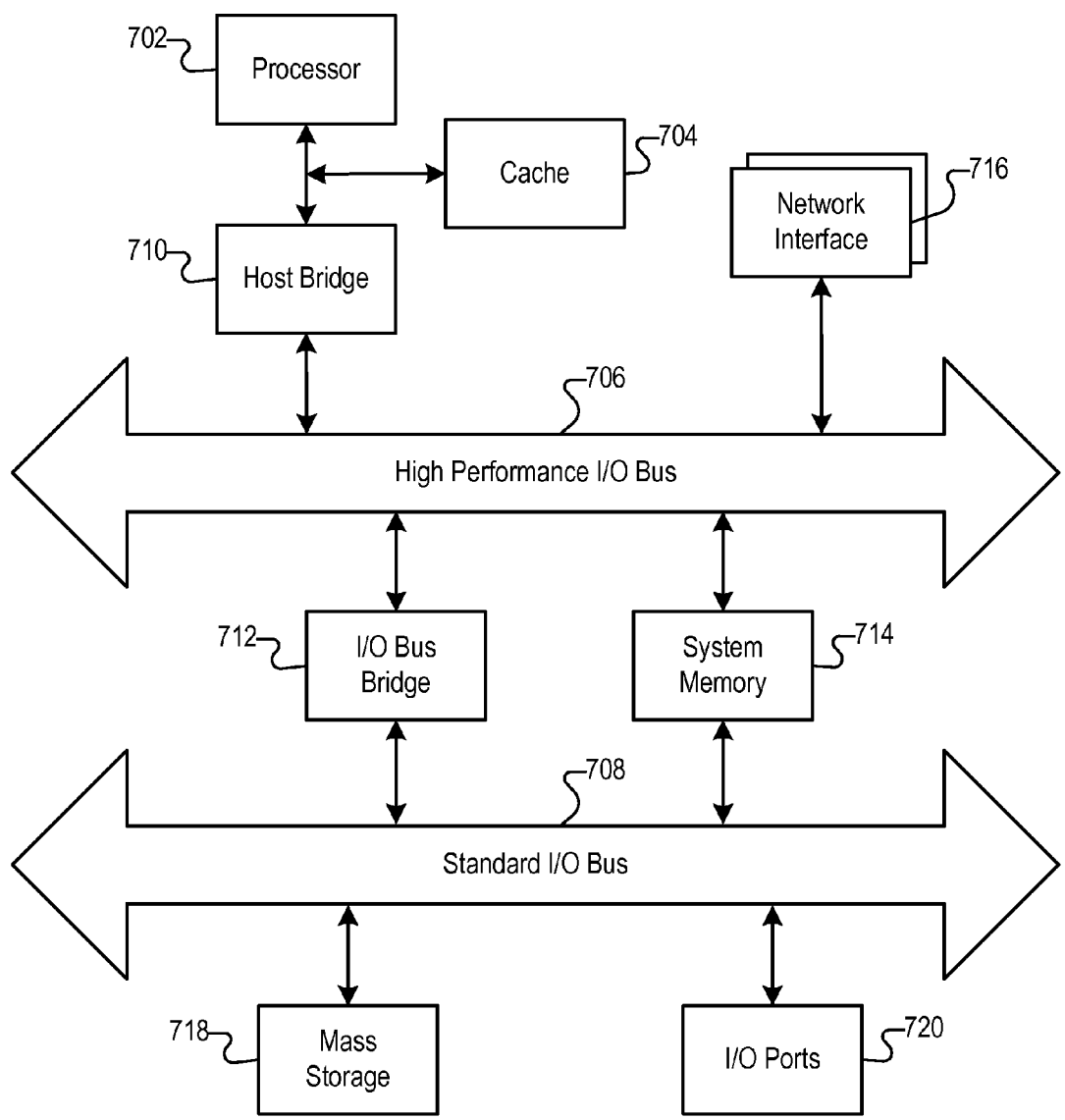
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, whether a candidate content item may be presented in response to an indication of approval by a user regarding a seed content item according to a first technique, wherein the seed content item is a seed page and the candidate content item is a candidate page;
    determining, by the computing system, whether the seed content item may be presented in response to an indication of approval by the user regarding the candidate content item according to a second technique; and
    processing, by the computing system, features, including a reciprocity feature based on the determining whether a candidate content item may be presented and the determining whether the seed content item may be presented, to generate a probability that the user will interact with the candidate content item.

2. The computer-implemented method of claim 1, further comprising:
    determining an existence of reciprocity associated with the reciprocity feature based on the first technique providing a forward recommendation and the second technique providing a reverse recommendation.

3. The computer-implemented method of claim 1, further comprising:
    determining a value of the reciprocity feature.

4. The computer-implemented method of claim 3, wherein the value of the reciprocity feature is binary.

5. The computer-implemented method of claim 3, wherein the value of the reciprocity feature is a score based on a strength of reciprocity between the seed content item and the candidate content item.

6. The computer-implemented method of claim 1, wherein the first technique and the second technique are same.

7. The computer-implemented method of claim 1, wherein the first technique and the second technique are different.

8. The computer-implemented method of claim 1, wherein the processing features further comprises:
    applying a machine learning technique based on the features.

9. The computer-implemented method of claim 1, further comprising:
    selecting the candidate content item for presentation to the user based on the probability that the user will interact with the candidate content item.

10. A system comprising:
    at least one processor; and
    a memory storing instructions that, when executed by the at least one processor, cause the system to perform:
    determining whether a candidate content item may be presented in response to an indication of approval by a user regarding a seed content item according to a first technique, wherein the seed content item is a seed page and the candidate content item is a candidate page;
    determining whether the seed content item may be presented in response to an indication of approval by the user regarding the candidate content item according to a second technique; and
    processing features, including a reciprocity feature based on the determining whether a candidate content item may be presented and the determining whether the seed content item may be presented, to generate a probability that the user will interact with the candidate content item.

11. The system of claim 10, wherein the seed content item is a seed page and the candidate content item is a candidate page.

12. The system of claim 10, further comprising:
    determining an existence of reciprocity associated with the reciprocity feature based on the first technique providing a forward recommendation and the second technique providing a reverse recommendation.

13. The system of claim 10, further comprising:
    determining a value of the reciprocity feature.

14. The system of claim 10, wherein the first technique and the second technique are same.

15. A non-transitory computer-readable storage medium including instructions that, when executed by at least one processor of a computing system, cause the computing system to perform a method comprising:
    determining whether a candidate content item may be presented in response to an indication of approval by a user regarding a seed content item according to a first technique, wherein the seed content item is a seed page and the candidate content item is a candidate page;
    determining whether the seed content item may be presented in response to an indication of approval by the user regarding the candidate content item according to a second technique; and
    processing features, including a reciprocity feature based on the determining whether a candidate content item may be presented and the determining whether the seed content item may be presented, to generate a probability that the user will interact with the candidate content item.

16. The non-transitory computer-readable storage medium of claim 15, wherein the seed content item is a seed page and the candidate content item is a candidate page.

17. The non-transitory computer-readable storage medium of claim 15, further comprising:
    determining an existence of reciprocity associated with the reciprocity feature based on the first technique providing a forward recommendation and the second technique providing a reverse recommendation.

18. The non-transitory computer-readable storage medium of claim 15, further comprising:
    determining a value of the reciprocity feature.

19. The non-transitory computer-readable storage medium of claim 15, wherein the first technique and the second technique are same.

* * * * *